United States Patent
Ito et al.

(10) Patent No.: US 7,620,388 B2
(45) Date of Patent: Nov. 17, 2009

(54) PORTABLE TELEPHONE SET, CONVERSATION SIMULATION METHOD, AND CONVERSATION SIMULATION PROGRAM

(75) Inventors: Kyoko Ito, Kawasaki (JP); Manabu Toyoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 411 days.

(21) Appl. No.: 11/357,969

(22) Filed: Feb. 22, 2006

(65) Prior Publication Data

US 2007/0111719 A1    May 17, 2007

(30) Foreign Application Priority Data

Nov. 17, 2005    (JP) .............................. 2005-332267

(51) Int. Cl.
H04L 12/58 (2006.01)
(52) U.S. Cl. ................. 455/412.1; 455/412.2; 455/413; 455/410; 455/418; 455/425
(58) Field of Classification Search .............. 455/412.1, 455/412.2, 413, 418, 425, 410
See application file for complete search history.

(56) References Cited

U.S. PATENT DOCUMENTS

| | | | | |
|---|---|---|---|---|
| 6,389,111 | B1 * | 5/2002 | Hollier et al. ................. | 379/28 |
| 6,609,943 | B1 * | 8/2003 | Chan .......................... | 446/297 |
| 6,728,679 | B1 * | 4/2004 | Strubbe et al. ........... | 704/270.1 |
| 6,795,808 | B1 * | 9/2004 | Strubbe et al. .............. | 704/275 |
| 2003/0148705 | A1 * | 8/2003 | Chan .......................... | 446/484 |
| 2005/0009536 | A1 | 1/2005 | Ito et al. | |
| 2006/0034432 | A1 * | 2/2006 | Starbuck et al. .......... | 379/88.23 |
| 2006/0073821 | A1 * | 4/2006 | Rantapuska ................. | 455/423 |

FOREIGN PATENT DOCUMENTS

| | | |
|---|---|---|
| JP | 2004-221746 | 8/2004 |
| JP | 2004-343647 | 12/2004 |
| JP | 2005-141478 | 6/2005 |
| WO | WO 03/069572 A1 | 8/2003 |

OTHER PUBLICATIONS

Japanese Office Action mailed on May 26, 2009 in corresponding Japanese Patent Application 2005-332267.

* cited by examiner

*Primary Examiner*—Joseph H Feild
*Assistant Examiner*—Huy D Nguyen
(74) *Attorney, Agent, or Firm*—Staas & Halsey LLP

(57) ABSTRACT

A portable telephone set has a function of conversation simulation with a user allows the user to easily perform pretended communication, and is provided with a scenario information storage unit storing conversation simulation scenario information using data prepared depending on an property of a conversation simulation partner and the conversation simulation date and time and stored in a storage unit of the portable telephone set itself as conversation simulation data, an acquisition unit acquiring the scenario information stored as associated with property information about an input conversation simulation partner and date-and-time information about an entry point of the conversation simulation from the scenario information storage unit, and an execution unit executing the conversation simulation with the user according to the scenario information acquired by the acquisition unit.

5 Claims, 9 Drawing Sheets

FIG. 2A

| NAME (A) | MAIL ADDRESS (A) | TELEPHONE NUMBER (A) | BIRTHDAY (B) |
|---|---|---|---|
| x x x x x | x x x x x x x x x | x x x x x x x | x x x x x |
| ⋮ | ⋮ | ⋮ | ⋮ |

FIG. 2B

| COMPANY NAME (C) | ADDRESS (C) |
|---|---|
| x x x x x | x x x x x x x x x x x x x x x x x |
| ⋮ | ⋮ |

FIG. 3A

| SOURCE (A) | SUBJECT (A/B/C/D) | RECEPTION DATE AND TIME (B) | TEXT OF RECEIVED MAIL (A/B/C/D) |
|---|---|---|---|
| x x x x x | x x x x x x x | x x x x x x x | x x x x x x x x x x |
| ⋮ | ⋮ | ⋮ | ⋮ |

FIG. 3B

| SOURCE (A) | SUBJECT (A/B/C/D) | TRANSMISSION DATE AND TIME (B) | TEXT OF TRANSMITTED MAIL (A/B/C/D) |
|---|---|---|---|
| x x x x x | x x x x x x x | x x x x x x x | x x x x x x x x x x |
| ⋮ | ⋮ | ⋮ | ⋮ |

FIG. 4A

| SOURCE TELEPHONE NUMBER (A) | COMMUNICATION DATE AND TIME (B) |
|---|---|
| x x x x x x x x | x x x x x x x x |
| ⋮ | ⋮ |

FIG. 4B

| DESTINATION TELEPHONE NUMBER (A) | COMMUNICATION DATE AND TIME (B) |
|---|---|
| x x x x x x x x | x x x x x x x x |
| ⋮ | ⋮ |

FIG. 5

| CONTENTS OF SCHEDULE (D) | STARTING DATE AND TIME (B) | PLACE (C) | MEMBER (A) |
|---|---|---|---|
| x x x x x x x x | x x x x x x | x x x x x x | x x x x x x x x |
| ⋮ | ⋮ | ⋮ | ⋮ |

FIG. 6

| TIME PERIOD | | TYPE | | | |
|---|---|---|---|---|---|
| | | FATHER | MOTHER | BROTHER OR SISTER | FRIEND |
| EARLY MORNING | 04:00~09:59 | a-1 | b-1 | c-1 | d-1 |
| DAYTIME | 10:00~15:59 | a-2 | b-2 | c-2 | d-2 |
| EVENING | 16:00~19:59 | a-3 | b-3 | c-3 | d-3 |
| NIGHT | 20:00~22:59 | a-4 | b-4 | c-4 | d-4 |
| MIDNIGHT | 23:00~03:59 | a-5 | b-5 | c-5 | d-5 |

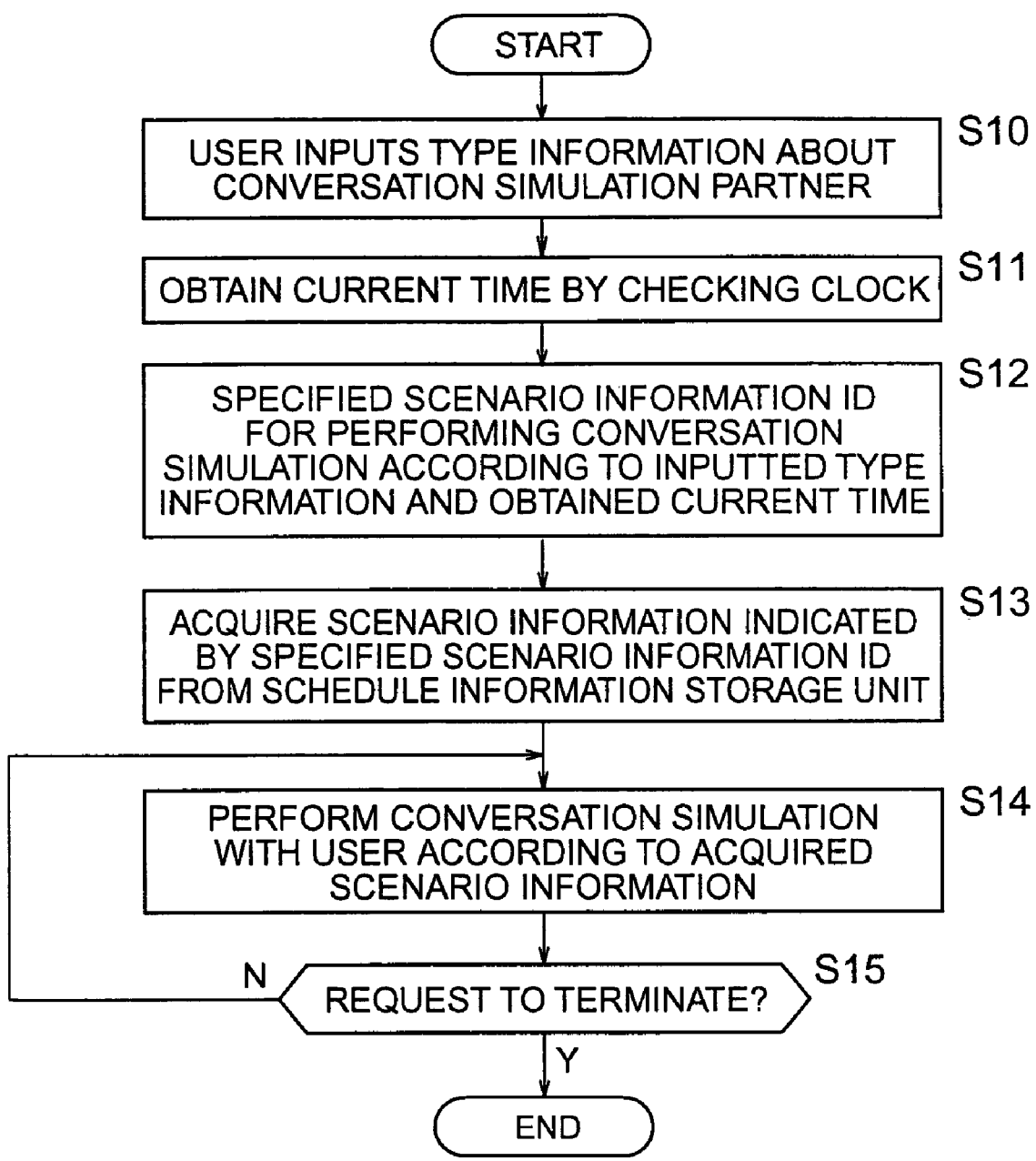

PORTABLE TELEPHONE SET, CONVERSATION SIMULATION METHOD, AND CONVERSATION SIMULATION PROGRAM

CROSS-REFERENCE TO RELATED APPLICATIONS

This application claims the conventional priority based on Japanese Patent Application No. 2005-332267, filed on Nov. 17, 2005, the disclosure of which is incorporated herein by reference.

BACKGROUND OF THE INVENTION

1. Field of the Invention

This invention relates to a portable telephone set, and more particularly to a portable telephone set having a conversation simulation function with a user, a conversation simulation method executed by the portable telephone set, and a conversation simulation program to realize the conversation simulation method.

2. Description of the Related Art

With a recent increasing frequency of occurrence of crime, it is increasing that people often feel dangerous when going back home at night, etc., for example.

In this case, by communicating on the portable telephone set with a family member or a friend, the user can enter the state in which any accident can be immediately transmitted to the communication partner on the portable telephone set, thereby suppress the action of a criminal.

However, it is not certain that the user can always communicate with an appropriate communication partner, or it may be a nuisance depending on the communication time to talk with the partner on the portable telephone set.

Then, there is a method proposed to solve the problem by talking with a security terminal provided by a security service agent during the movement of the user (for example, refer to the patent document 1; International Publication No. 2003/069572 as a pamphlet).

In the invention described in the patent document 1, it is necessary for a user to make a contract in advance with a security service agent in order to communicate by voice with a security terminal provided by the security service agent. Further, due to the above contract, a contract fee is incurred.

In addition, it is necessary to make a connection to the security terminal actually over a network according to the invention described in the patent document 1. Thus, it is also necessary to pay a communication fee, and there is the possibility that the service cannot be provided when the radio status is not good or the location of a user is out of service.

To avoid the above-mentioned problems, it is assumed that a user pretends to be communicating with a partner although the user is not actually communicating with the partner on the portable telephone set. This is because that the above pretended communication can suppress the action of a criminal.

However, since it is practically hard to make a conversation by oneself, a user cannot easily pretend a communication.

SUMMARY OF THE INVENTION

The present invention has been developed to solve the above-mentioned problems, and it is an object of the present invention to provide a portable telephone set having the conversation simulation function of communicating with a user to realize a conversation simulation of allowing a user to easily pretend a communication.

To achieve the object, the portable telephone set of the present invention realizes the conversation simulation function of communicating with a user, and comprises a scenario information storage unit storing scenario information for the conversation simulation, an acquisition unit for acquiring the scenario information from the scenario information storage unit, and an execution unit executing the conversation simulation with the user according to the scenario information acquired by the acquisition unit. Further, according to the one embodiment of the present invention, the scenario information may use data prepared depending on an property of a conversation simulation partner, and the conversation simulation date and time and stored in the portable telephone set itself as conversation simulation data, and the scenario information may be stored as associated with an inputted property information of a conversation simulation partner and date-and-time information of starting point of the conversation simulation. Still further, the portable telephone set of the present invention may further comprises input unit inputting the property information about a conversation simulation partner, and obtaining unit obtaining date-and-time information about a time point of an entry of conversation simulation.

In addition to the above feature, the scenario information may be formed by first information about a sentence as a framework of conversation simulation (or simulated conversation), second information about what conversation simulation data is retrieved from which storage unit of a portable telephone set itself and is embedded (or insert) in which position in the framework sentence, and third information about a no-conversation time for an answer.

Further, the scenario information may describe as storage unit from which conversation simulation data is retrieved at least one of first storage unit storing directory (or telephone directory) information, second storage unit storing mail information, third storage unit for storing communication information, and forth storage unit for storing schedule information.

The execution unit may retrieve the latest conversation simulation data when retrieving the conversation simulation data from the storage unit storing conversation simulation data.

Each processing unit except the above-mentioned storage unit can be realized by a computer program. And, the computer program can be provided after being recorded on an appropriate computer-readable recording medium or provided over a network, installed when the present invention is executed, and is operated on control unit such as a CPU (Central Processing Unit), thereby realizing the present invention.

In the portable telephone set according to the present invention with the above-mentioned feature, when a user issues a request to have the conversation simulation function, the portable telephone set refers to inputted property information by the user about a conversation simulation partner, and the clock of the portable telephone set itself, thereby obtaining the date-and-time information at the time.

Then, by referring to the scenario information storage unit according to the inputted property information about the conversation simulation partner and the obtained date-and-time information as keys, the scenario information is acquired from the scenario information storage unit.

According to the acquired scenario information, the conversation simulation data is retrieved from the storage unit of the portable telephone set itself, the retrieved conversation simulation data is embedded in the sentence as a framework of conversation simulation (or simulated conversation) and output as voice. Then, after the passage of a no-conversation time for an answer by the user, the subsequent voice output is performed. And, the above processes are repeated, thereby performing the conversation simulation with the user.

Thus, the portable telephone set according to the present invention performs the process of executing conversation simulation with a user according to the scenario information for conversation simulation by using data stored in the storage unit of the portable telephone set itself as conversation simulation data.

As described above, according to the present invention, when the user pretends to be communicating on the portable telephone set, the user can pretend to be communicating on the portable telephone set by answering the voice outputted by the portable telephone set, thereby possibly and easily pretending to be communicating.

Further, according to the present invention, when the user pretends to be communicating on the portable telephone set, the user can make simulated conversation depending on the date and time at the time and the property of a person selected as a conversation simulation partner, and also the user can make the simulated conversation which uses the conversation simulation data acquired from the storage unit of the portable telephone set itself. As a result, the pretended communication can be performed quite naturally.

Therefore, according to the present invention, the user can easily and naturally pretend communication using the portable telephone set, thereby suppressing the action of a criminal without a communication fee or a contract fee.

BRIEF DESCRIPTION OF THE DRAWINGS

FIGS. 2A and 2B are an explanatory view of the information stored in the directory information storage unit.

FIGS. 3A and 3B are an explanatory view of the information stored in the mail information storage unit.

FIGS. 4A and 4B are an explanatory view of the information stored in the communication information storage unit.

FIG. 5 is an explanatory view of the information stored in the schedule information storage unit.

FIG. 6 is an explanatory view of the table data of a scenario pattern table.

FIG. 9 is a flowchart executed by the conversation simulation execution unit.

DETAILED DESCRIPTION OF THE PREFERRED EMBODIMENTS

The present invention is described below in detail with reference to the embodiments.

Figure 1:
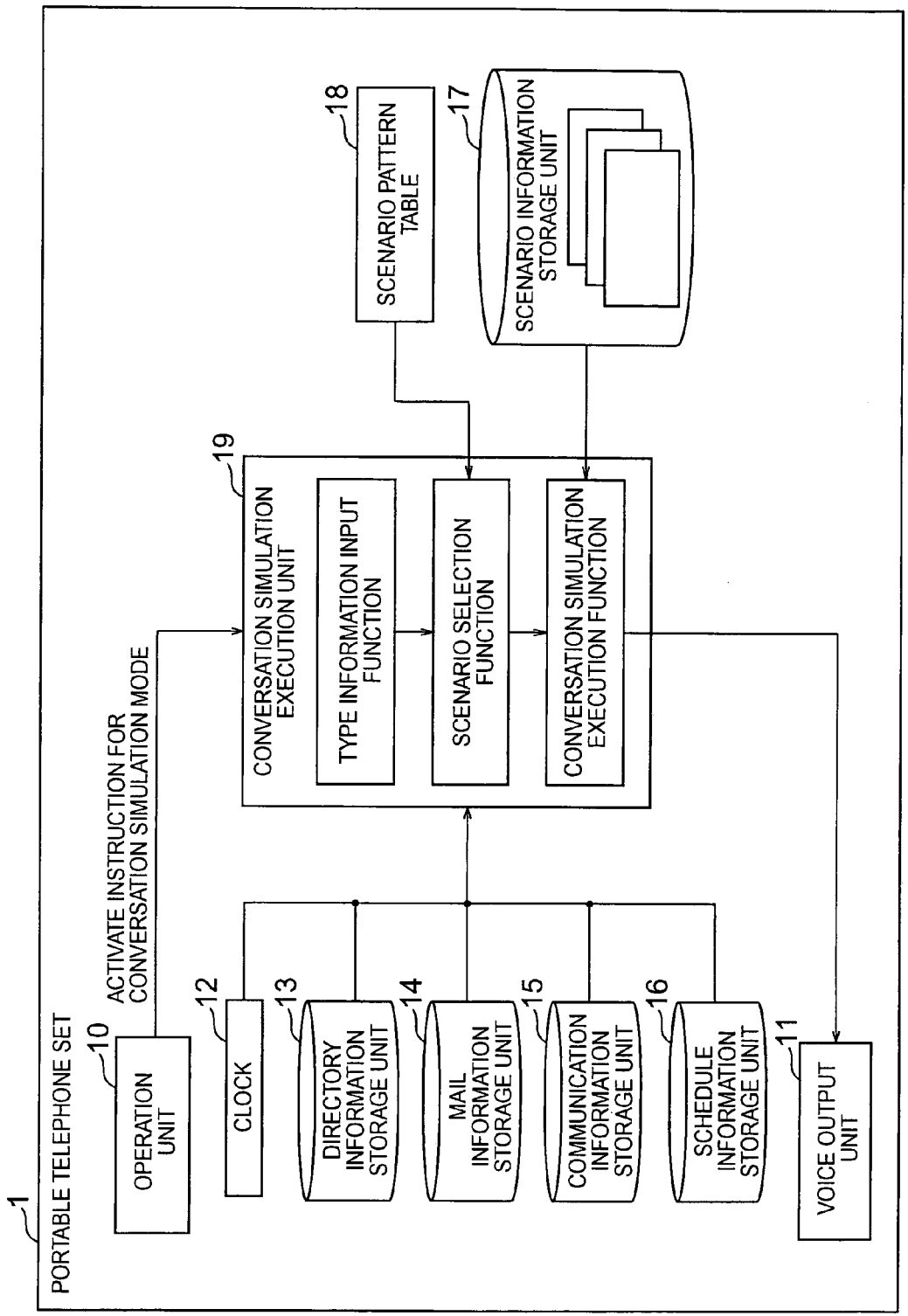
FIG. 1 shows an embodiment of the portable telephone set according to the present invention.

FIG. 1 shows an embodiment of a portable telephone set (mobile phone or cellular phone) 1 having the feature of the present invention.

As shown in FIG. 1, the portable telephone set 1 to which the present invention is applied comprises an operation unit 10 having an input key and a display, a voice output unit 11 for outputting voice, a clock 12 for keeping a date and time, a directory information storage unit 13 for storing directory information, a mail information storage unit 14 for storing mail information, a communication information storage unit 15 for storing communication information, a schedule information storage unit 16 for storing schedule information, a scenario information storage unit 17, a scenario pattern table 18, and a conversation simulation execution unit 19.

The directory information storage unit 13 is also provided for the conventional portable telephone set. As shown in FIG. 2, for example, the unit 13 stores, the information including a mail address, a telephone number, and a birthday as associated with a personal name, and the information about a company address as associated with a company name.

The mail information storage unit 14 is also provided for the conventional portable telephone set. As shown in FIG. 3, for example, the unit 14 stores the information including a subject, a reception date and time, and a text of a received mail as associated with the information about a source of a received mail, and the information about a subject, a transmission date and time, and a text of a transmitted mail as associated with the information about a destination of a transmitted mail.

The communication information storage unit 15 is also provided for the conventional portable telephone set. As shown in FIG. 4, for example, the unit 15 stores the information about a communication date and time as associated with a telephone number of the source of a communication, and the information about a communication date and time as associated with a telephone number of the destination of a communication. The portable telephone set number stored in the communication information storage unit 15 can be specified who has the number according to the information stored in the directory information storage unit 13.

The schedule information storage unit 16 is also provided for the conventional portable telephone set. As shown in FIG. 5, for example, the unit 16 stores the information about the starting date and time, the place, and the members of the schedule as associated with the contents of a schedule.

The scenario information storage unit 17 is provided to realize the present invention. The unit 17 is prepared depending on the type of a conversation simulation partner and the conversation simulation date and time, and stores conversation simulation scenario information, which uses the data stored in the directory information storage unit 13, the mail information storage unit 14, the communication information storage unit 15, and the schedule information storage unit 16 as conversation simulation data.

The scenario pattern table 18 is provided to realize the present invention. The unit 18 stores the information about which scenario to be used to perform a conversation simulation as associated with the type of conversation simulation partner and the time period of the conversation simulation date and time. For example, as shown in FIG. 6, when a conversation simulation is to be performed with the father during daytime from 10:00 to 15:59, the unit 18 stores the information which shows the scenario information having the ID "a-2" is to be used for the above conversation simulation.

The conversation simulation execution unit 19 is provided to realize the present invention. When a user issues an activate instruction for a conversation simulation mode through the operation unit 10, the unit 19 acquires scenario information from the scenario information storage unit 17, and executes conversation simulation with the user according to the acquired scenario information.

The scenario information in the conversation simulation is explained below.

The scenario information is prepared to realize conversation simulation with a user, and describes the information for realizing the conversation simulation. For this description purpose, the scenario information uses information (indicated by (A) shown in FIGS. 2 to 5) corresponding to "who communicates with who?" designated by "Who" in the communication stored in the directory information storage unit 13, the mail information storage unit 14, the communication information storage unit 15 and the schedule information storage unit 16. Further, the scenario information uses information (indicated by (B) shown in FIGS. 2 to 5) corresponding to "when?" designated by "When" in the communication stored in the directory information storage unit 13, the mail information storage unit 14, the communication information storage unit 15, and the schedule information storage unit 16. Still further, the scenario information uses information (indicated by (C) shown in FIGS. 2 to 5) corresponding to "where?" designated by "Where" in the communication stored in the directory information storage unit 13, the mail information storage unit 14, the communication information storage unit 15, and the schedule information storage unit 16. And, still more, the scenario information uses information (indicated by (D) shown in FIGS. 2 to 5) corresponding to "what is to be performed?" designated by "What" in the communication stored in the directory information storage unit 13, the mail information storage unit 14, the communication information storage unit 15, and the schedule information storage unit 16.

Although not described above, the identification characters A, B, C, and D are used in the information stored in the directory information storage unit 13, the mail information storage unit 14, the communication information storage unit 15, and the schedule information storage unit 16 to record the information used to indicate the information about "Who", "When", "Where", and "What" in the conversation, respectively.

The scenario information is constituted by a program itself, or a data string that can be interpreted by a program.

When the scenario information is constituted by a program itself, the conversation simulation execution unit 19 realizes conversation simulation with a user by executing the program of the scenario information. On the other hand, when the scenario information is constituted by a data string that can be interpreted by a program, the unit 19 realizes the conversation simulation with a user by interpreting and executing the data string of the scenario information.

Figure 7:
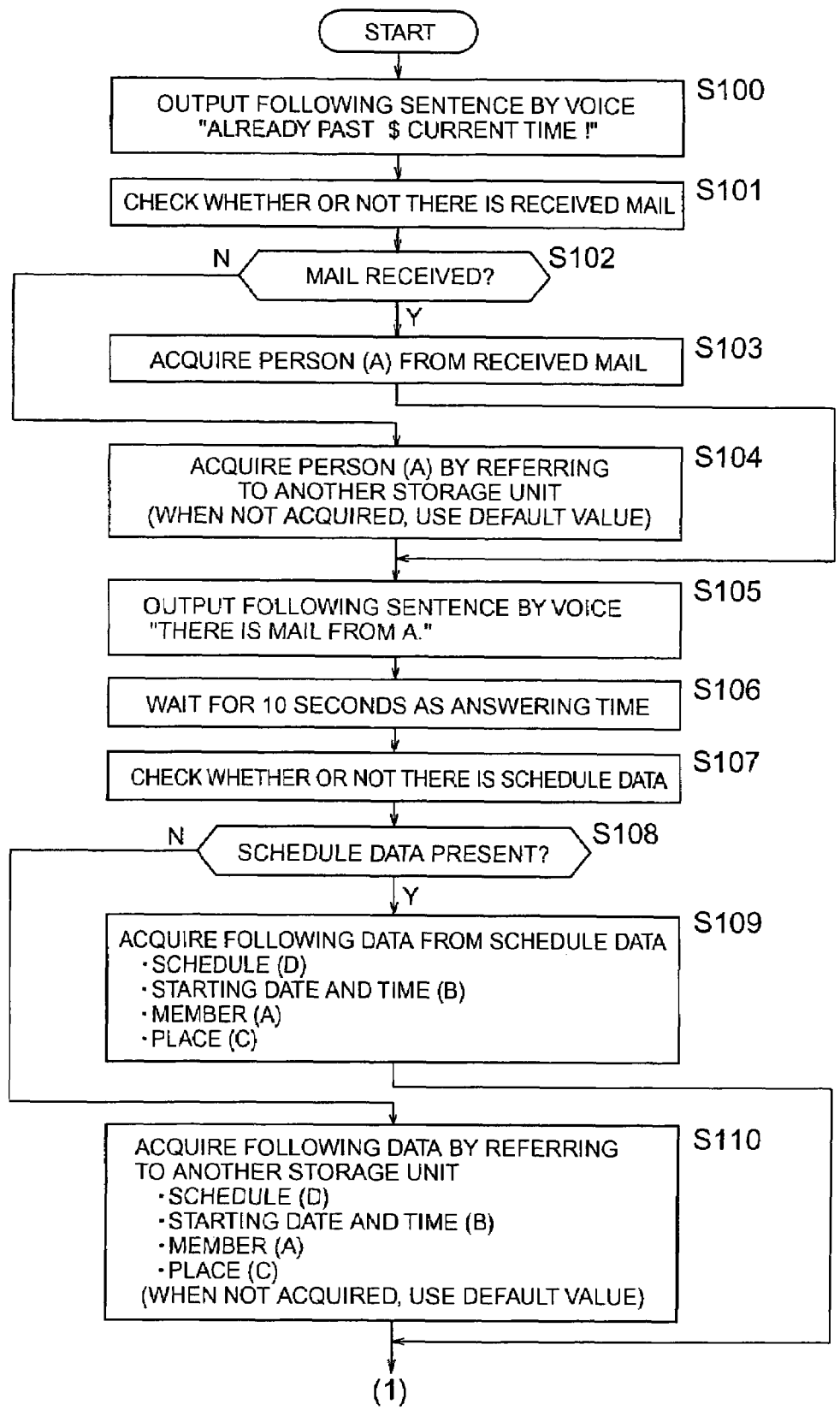
FIGS. 7 and 8 show an example of scenario information.
Figure 8:
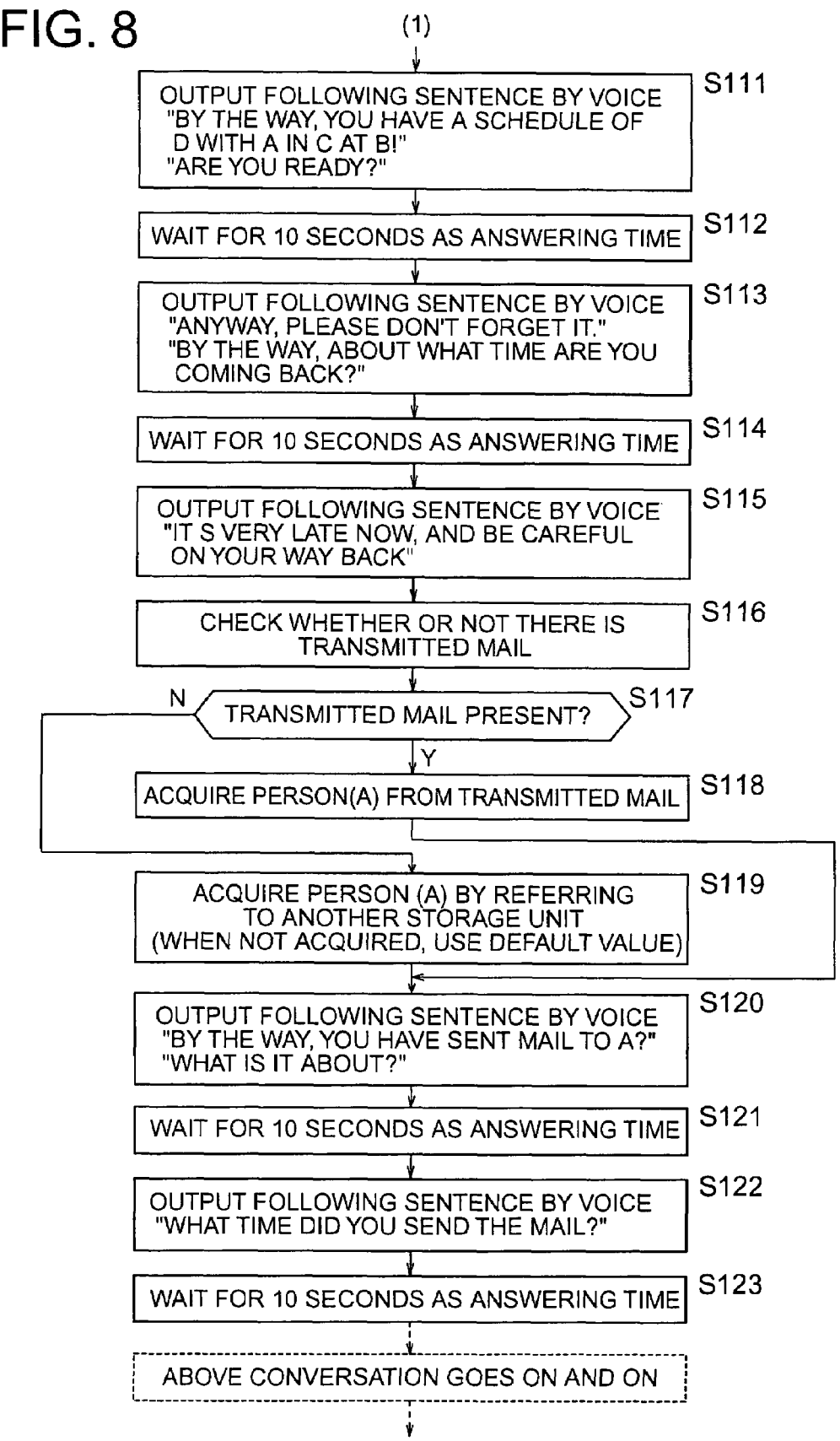

FIGS. 7 and 8 show an example of scenario information.

The scenario information shown in FIGS. 7 and 8 assumes that the scenario information having the ID of "b-5" indicating the conversation simulation with the mother at midnight from 23:00 to 03:59. And, the scenario information is described by a flowchart for convenience in explanation.

Explained below is the scenario information shown in FIGS. 7 and 8.

In the scenario information shown in FIGS. 7 and 8, first of all, in a step 100, the sentence "Already past '$ current time.'!"

is outputted by voice using the current time acquired in advance as the introduction of the conversation.

Then, in a step 101, it is checked whether or not there is received mail by referring to the mail information storage unit 14. In a step 102, it is determined whether or not a check result that there is received mail has been obtained.

When it is determined that there is received mail in the determining process in the step 102, the processing is proceeded to a step 103, and a person (A) is acquired from the source information about the received mail. At this time, when a plurality of mails has been received, the person (A) is acquired from the source information about the latest received mail, for example.

On the other hand, when it is determined that there is no received mail in the determining process in the step 102, the processing is proceeded to a step 104, and the person (A) is acquired by referring to other storage units. At this time, when the person (A) cannot be acquired even by referring to other storage units, the person (A) as a default value prepared in advance is used.

Then, in a step 105, the sentence

"There is mail from A."

is outputted by voice using the person (A) acquired in the processes in the steps 103 and 104.

In a step 106, 10 seconds are awaited as a user answering time in response to the voice output. After that, in a step 107, it is checked whether or not there is schedule data by referring to the schedule information storage unit 16. In a step 108, it is determined whether or not a check result that there is schedule data has been obtained.

When it is determined that there is the schedule data in the determining process in the step 108, the processing is proceeded to a step 109, and a schedule (D), a starting date and time (B), a member (A), and a place (C) are acquired from the schedule data. At this time, when there is a plurality of schedule data, the schedule (D), the starting date and time (B), the member (A), and the place (C) are acquired from the latest schedule data, for example.

When it is determined that there is no schedule data in the determining process in the step 108, the processing is proceeded to a step 110, and a schedule (D), a starting date and time (B), a member (A), and a place (C) are acquired by referring to other storage units. At this time, when the schedule (D), the starting date and time (B), the member (A), and the place (C) cannot be acquired even by referring to other storage units, then the schedule (D), starting date and time (B), member (A), and place (C) as default values prepared in advance are used.

Then, in a step 111, the sentences

"By the way, you have a schedule of D with A in C at B!", and

"Are you ready?"

are outputted by voice using the schedule (D), the starting date and time (B), the member (A), and the place (C) acquired in the processes in the steps 109 and 110.

Then, in a step 112, 10 seconds are awaited as a user answering time in response to the voice output. After that, in a step 113, the sentences "Anyway, please don't forget it.", and "By the way, about what time are you coming back?"

are outputted by voice.

In a step 114, 10 seconds are awaited as a user answering time in response to the voice output. Then, in a step 115, the sentence "It's very late now, and be careful on your way back."

is outputted by voice.

In a step 116, it is checked whether or not there is transmitted mail by referring to the mail information storage unit 14. Then, in a step 117, it is determined whether or not a check result that there is transmitted mail has been obtained.

When it is determined that there is transmitted mail in the determining process in the step 117, then the processing is proceeded to a step 118, and a person (A) is acquired from the destination information of the transmitted mail. At this time, when a plurality of mails has been transmitted, the person (A) is acquired from the destination information about the latest transmitted mail, for example.

When it is determined that there is no transmitted mail in the determining process in the step 117, then the processing is proceeded to a step 119, and the person (A) is acquired by referring to other storage units. At this time, when the person (A) cannot be acquired even by referring to other storage units, then the person (A) as a predetermined default value is used.

Then, in a step 120, the sentences

"By the way, you have sent mail to A?", and

"What is it about?"

are outputted by voice using the person (A) acquired in the processes in the steps 118 and 119.

In a step 121, 10 seconds are awaited as a user answering time in response to the voice output, and then the sentence "What time did you send the mail?"

is outputted by voice in a step 122.

In a step 123, 10 seconds are awaited as a user answering time in response to the voice output.

The scenario description continues as described above, and can also be repeated by returning to the step 100 when a certain length of scenario description is exceeded.

The process performed by the conversation simulation execution unit 19 is explained below by referring to the flowchart shown in FIG. 9.

As shown in the flowchart of FIG. 9, when the conversation simulation execution unit 19 receives an instruction to activate the conversation simulation mode through the operation unit 10, the unit 19 firstly is inputted the type information about a conversation simulation partner in a step 10, and then the unit 19 obtains the current time by referring to the clock 12 in a step 11.

In a step 12, the ID of the scenario information for the execution of conversation simulation is specified by referring to the scenario pattern table 18 by using the inputted type information about the conversation simulation partner and the obtained current time as keys.

In a step 13, the scenario information indicated by the specified scenario information ID is acquired from the scenario information storage unit 17.

Then, in a step 14, the conversation simulation is executed with a user according to the acquired scenario information. For example, the conversation simulation is executed with the user by executing the scenario information as shown in FIGS. 7 and 8.

In a step 15, it is determined whether or not there is a user request to terminate the conversation simulation. When there is no request to terminate the conversation simulation, the conversation simulation with the user continues according to the acquired scenario information. When there is the request to terminate the conversation simulation, a conversation simulation process is terminated.

As described above, the user can perform the following conversation using the portable telephone set 1 according to the present invention only by answering the voice outputted from the portable telephone set 1 of the present invention.

(1) Mother "It's already past twelve!"
    (* "twelve" is acquired from the current time.)
    "What are you doing late at night?"
(2) User "Hello, Mother! I was forced to finish a troublesome job."
(3) Mother "There is mail from Ms. Sato."
    (*"Sato" is acquired from the mail information.)
(4) User "Is there? What is it about?"
(5) Mother "Do you know the schedule on the 10th?"
    (*"10th" is acquired from the schedule information.)
    "An appointment in Yokohama."
    (*"Yokohama" is acquired from the schedule information.)
    "Are you ready?"
(6) User "Yes, I am."
(7) Mother "Looking forward to the concert."
    (*"Concert" is acquired from the schedule information.)

Thus, the user can easily pretend to be communicating with her mother.

Relating to the voice output of the portable telephone set 1 according to the present invention, mechanical voice can be used or recorded voice can be synthesized.

The portable telephone set 1 according to the present invention generates the conversation text of conversation simulation by embedding the data from the directory information storage unit 13, the mail information storage unit 14, the communication information storage unit 15, and the schedule information storage unit 16 in the sentence as a framework of the conversation simulation (simulated conversation) as described above.

Since the generated conversation text is composed according to the property of the data, it will not be nonsense text. In addition, since the current time and the date and time for schedule information are used, a more realistic sentence can be generated. Furthermore, the latest mail or the information about the reception date and time can be selected on the priority basis, thereby generating more appropriate conversation text in time and season.

The present invention has been described according to the embodiments by referring to the attached drawings, but the present invention is not limited to these embodiments. For example, the four types of data properties of A, B, C, and D are used in generating conversation text in the embodiments above. However, for example, the data type D (What) can be further classified to D-1 for foods, D-2 for vehicles, D-3 for animals, etc. in generating more realistic conversation text.

Furthermore, according to the embodiments, the conversation simulation is executed according to the scenario information based on the current time, but the scenario information can be used in generating more realistic conversation text by selecting data for a current season and time.

According to the present invention, a user can easily and naturally pretend to be communicating with a partner on the portable telephone set.

As a result, the user can check the action of a criminal by pretended communication on the portable telephone set, for example, on the way back home by night, etc., and the pretended communication can be successfully performed as necessary for any reason.

What is claimed is:

1. A portable telephone set capable of conversation simulation with a user, comprising:
    a scenario information storage unit storing conversation simulation scenario information stored in the portable telephone set as conversation simulation data prepared depending on a conversation simulation date and time and stored in the portable telephone set itself as the conversation simulation data;
    an acquisition unit acquiring the scenario information stored as associated with date-and-time information of a starting point of the conversation simulation from the scenario information storage unit; and
    an execution unit executing the conversation simulation with the user according to the scenario information acquired by the acquisition unit, wherein
    the scenario information storage unit stores conversation simulation scenario information prepared further depending on a property of a conversation simulation partner and the scenario information stored as further associated with the conversation simulation partner in the portable telephone set as the conversation simulation data, and the acquisition unit acquires the scenario information stored as associated with the conversation simulation partner from the scenario information storage unit and the scenario information describes first information about a sentence as a framework of conversation simulation, second information about which storage unit of the portable telephone set retrieves what conversation simulation data and embeds the retrieved data in which position of the framework sentence, and third information about a no-conversation time for an answer.

2. The portable telephone set according to claim 1, wherein the scenario information describes as a storage unit from which the conversation simulation data is retrieved at least one of first storage unit storing directory information, second storage unit storing mail information, third storage unit storing communication information, and fourth storage unit storing schedule information.

3. The portable telephone set according to claim 1, wherein the execution unit retrieves the latest conversation simulation data when retrieving conversation simulation data from the storage unit storing the conversation simulation data.

4. A conversation simulation method executed on a portable telephone set having a function of conversation simulation with a user, the method comprising:

acquiring scenario information stored as associated with an inputted property information of a conversation simulation partner and date-and-time information of a starting point of the conversation simulation from scenario information storage, the storage storing scenario information for the conversation simulation, the scenario information using data prepared depending on a property of a conversation simulation partner and the conversation simulation date and time and stored in the portable telephone set itself as conversation simulation data; and executing the conversation simulation with the user according to the acquired scenario information wherein the scenario information describes first information about a sentence as a framework of conversation simulation, second information about which storage unit of the portable telephone set retrieves what conversation simulation data and embeds the retrieved data in which position of the framework sentence, and third information about a no-conversation time for an answer.

5. A computer-readable recording medium recording a conversation simulation program for realizing a portable telephone set having a function of conversation simulation with a user, the program causing a computer to execute:

acquiring scenario information stored as associated with an inputted property information of a conversation simulation partner and date-and-time information of a starting point of the conversation simulation from scenario information storage, the storage storing scenario information for the conversation simulation, the scenario information using data prepared depending on a property of a conversation simulation partner and the conversation simulation date and time and stored in the portable telephone set itself as conversation simulation data; and executing the conversation simulation with the user according to the acquired scenario information, wherein the scenario information describes first information about a sentence as a framework of conversation simulation, second information about which storage unit of the portable telephone set retrieves what conversation simulation data and embeds the retrieved data in which position of the framework sentence, and third information about a no-conversation time for an answer.

* * * * *